United States Patent Office 3,379,090
Patented Apr. 23, 1968

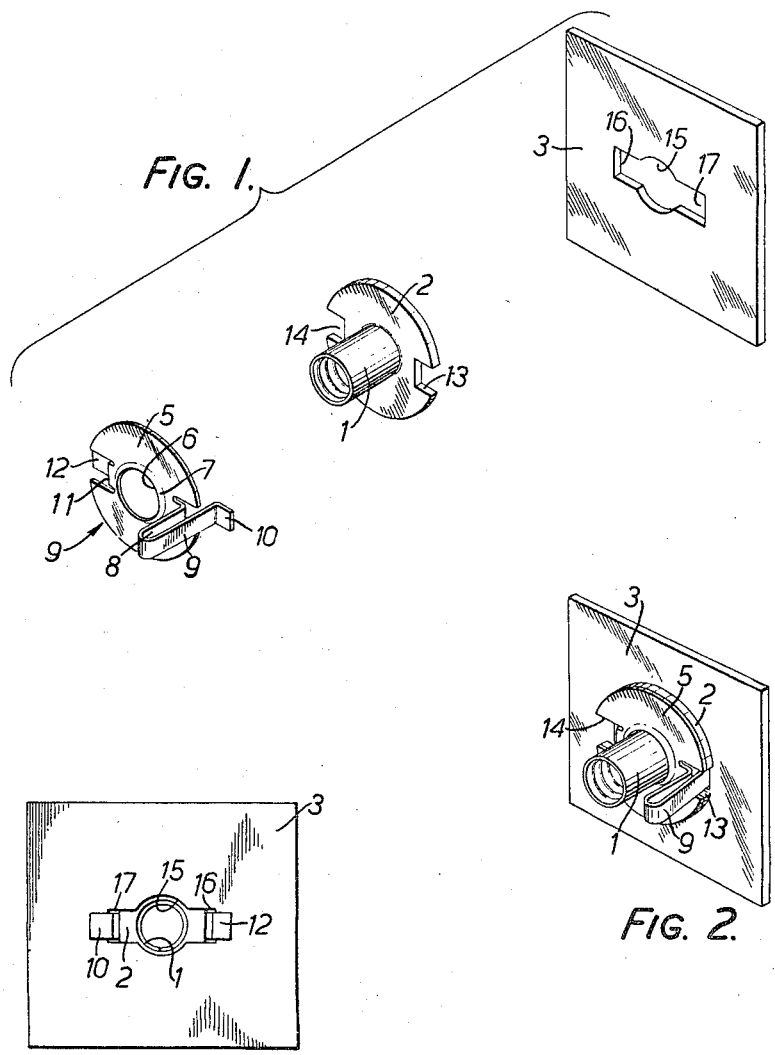

3,379,090
CLIP FOR SECURING AN ARTICLE TO AN APERTURED SUPPORT
Leslie Parkin, Bobbers Hill, England, assignor to United-Carr Incorporated, Boston, Mass., a corporation of Delaware
Filed Feb. 23, 1966, Ser. No. 529,396
Claims priority, application Great Britain, Mar. 22, 1965, 12,087/65
3 Claims. (Cl. 85—80)

ABSTRACT OF THE DISCLOSURE

A nut assembly comprising a nut having a tubular barrel with a flange at one end and a retaining device having an apertured base portion with arms extending therefrom. The barrel of the nut is received through the apertured base and lug portions at the free ends of the arms engage the workpiece to maintain assembly.

This invention relates to a retainer device for securing a nut of the kind comprising an internally threaded barrel having a flange at one end to an apertured support.

The invention provides a retainer device for securing a nut of the kind referred to, to an apertured support, the retainer device comprising a plate-like base formed with an aperture for receiving the barrel of the nut and spaced arms extending at right angles to the plane of the base and projecting beyond one face thereof so as to be insertable through the aperture in the support, each arm having means for engaging a portion of the adjacent face of the support surrounding the aperture therein.

The invention further provides a nut assembly comprising a nut of the kind referred to and a retainer device assembled therewith and comprising a plate-like base having an aperture through which the barrel of the nut extends so that the flange of the nut abuts one face of the base of the retainer device, the base being provided with arms spaced relatively to one another and extending substantially at right angles to the plane of the base so as to project beyond the face thereof against which the flange of the nut abuts, the arms having an axial length such that they project beyond the face of the flange remote from the base of the retainer so as to be insertable through the aperture in the support, each arm having means for engaging a portion of the adjacent face of the support surrounding the aperture therein for the purpose of securing the assembly to the support.

To enable the invention to be fully understood, it will now be described, by way of example, with reference to the accompanying drawings in which:

FIGURE 1 is an exploded view illustrating a nut, a retainer device, and an apertured support to which the nut is to be secured by the retainer;

FIGURE 2 is a perspective view of a nut secured to the support by the retainer;

FIGURE 3 is a rear view of the assembly illustrated in FIGURE 2; and

FIGURE 4 is a plan view of a retainer device according to a modified form of the invention.

As illustrated in FIGURES 1 to 3 of the drawings, the nut comprises an internally threaded barrel 1 having a radial flange 2 at one end, the nut being adapted to be secured to an apertured support 3 by a retainer generally indicated by 4. As shown, the retainer is formed of spring metal and includes a base 5 formed with an aperture 6, the portion of the base surrounding the aperture being slightly dished as indicated by 7.

The base is formed with an integral resilient arm 8 extending substantially at right angles to the plane of the base so as to project from one face thereof, the arm including a reversely bent portion to provide a second arm 9, the free end of which projects beyond the base and is provided with a lug 10 projecting laterally outwardly of the arm. At an oppositely disposed portion of the base 5 to the arms 8, 9, a further arm 11 is provided substantially at right angles to the base and projecting beyond the same face of the base as the free end of the arm 9, the arm 11 being provided with a lug 12 projecting laterally outwardly of the arm 11.

To secure the nut to the apertured support 3, the nut is first assembled with the retainer by inserting the barrel 1 of the nut into the aperture 6 of the retainer so that the base 5 overlies the flange 2 of the nut and the arms 9 and 11 are positioned in recesses 13, 14 in the flange 2. As shown, the aperture in the support is of elongated shape and includes a substantially circular central portion 15 and slots 16 and 17 extending from opposite sides. To secure the nut to the support, the nut with the assembled retainer is presented to the apertured portion of the support and tilted to enable the lug 12 to be inserted through the slot 16 into engagement with the rear face of the support at the end of the slot. The arm 9 is then flexed radially of the base inwardly to permit the lug 10 to enter the slot 17, the arm then being released to permit the arm to revert to its normal position so that the lug 10 engages the rear face of the support at the end of the slot 17. When the nut assembly is thus attached to the support, the spring arm 9 will resiliently engage the end wall of the slot 17, and the assembly is thereby retained on the support by the flange of the nut abutting one face and the lugs 10 and 12 the opposite face. It will be understood that the internally threaded bore of the barrel 1 extends right through the flange 2 and is aligned with the central portion 15 of the aperture in the support.

In the modification illustrated in FIGURE 4, the retainer is similar to that illustrated in FIGURES 1 to 3 except that the base 5a is formed with a plurality of resilient tongues 18, the free ends of which define an aperture having a diameter slightly less than the outer diameter of the barrel 1 of the nut. Like parts of the retainer illustrated in FIGURE 4 have been given like reference numerals to those used in FIGURES 1 to 3 but with the addition of the index a. The provision of the tongues 18 enables the nut to be attached to the retainer, as when the barrel is inserted through the aperture in the base 5a, the free ends of the tongues 18 will frictionally grip the barrel. Accordingly, the nut with the fastener device attached forms a unit which can be transported and stored in a condition ready for immediate attachment to an apertured support.

I claim:

1. A nut assembly for attachment to an apertured support comprising a nut having a threaded barrel and a peripheral flange at one end of the barrel, the flange having opposed slots extending from its peripheral edge inwardly toward the barrel, and a retainer device assembled therewith and comprising a plate-like base having an aperture through which the barrel of the nut extends so that the flange of the nut abuts one face of the base of the retainer device, the base being provided with arms spaced relatively to one another and respectively integrally connected to the base at a position spaced substantially inwardly from the peripheral edge thereof, one of the arms being resiliently connected with the base by a reversely bent portion extending toward the end of the nut barrel remote from the flange so as to be capable of flexing movement radially inwardly thereof, the arms extending substantially at right angles to the plane of the base and projecting through the opposed slots in the flange of the nut and beyond the face of the base against which the flange of the nut abuts, the arms having an axial length such that the ends thereof remote from the base project beyond the face of the flange of the nut remote from the base of the retainer so as to be insertable through the aperture in the support, each arm having a flat, planar lug extending generally perpendicularly from the said end thereof for engaging a portion of the adjacent face of the support surrounding the aperture therein for the purpose of securing the assembly to the support.

2. A nut assembly according to claim 1 wherein the aperture in the base of the retainer device is defined by inwardly extending resilient tongues making frictional engagement with the barrel of the nut.

3. The combination of an apertured support and a nut assembly according to claim 1 mounted thereon, the flange of the nut being clamped against one face of the support by the base of the retainer device and the arms extending through the aperture in the support, the lugs on each of the arms being engaged with portions of the opposite face of the support surrounding the aperture therein so as to retain the nut and retainer device in assembly with the support.

References Cited

UNITED STATES PATENTS

| | | | |
|---|---|---|---|
| 1,768,505 | 6/1930 | Carr | 85—80 |
| 1,800,176 | 4/1931 | Carr | 85—80 |
| 2,144,553 | 1/1939 | Simmonds | 151—41.76 |
| 2,406,415 | 8/1946 | Tinnerman | 85—80 |
| 2,443,752 | 6/1948 | Tinnerman | 151—41.76 |
| 2,460,722 | 2/1949 | Warra | 24—73 |
| 2,724,419 | 11/1955 | Poupitch | 151—41.74 |
| 3,192,823 | 7/1965 | Munse | 151—41.75 |

FOREIGN PATENTS

| | | |
|---|---|---|
| 658,776 | 10/1951 | Great Britain. |
| 1,403,611 | 5/1965 | France. |

MARION PARSONS, JR., *Primary Examiner.*